United States Patent
Morales

(10) Patent No.: US 12,118,258 B2
(45) Date of Patent: Oct. 15, 2024

(54) METHODS AND PRINTING SYSTEM FOR PEER-TO-PEER PRINTING DEVICE MANAGEMENT

(71) Applicant: Kyocera Document Solutions Inc., Osaka (JP)

(72) Inventor: Javier A. Morales, Rochester, NY (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 18/112,102

(22) Filed: Feb. 21, 2023

(65) Prior Publication Data

US 2024/0281184 A1     Aug. 22, 2024

(51) Int. Cl.
*G06F 3/12*     (2006.01)

(52) U.S. Cl.
CPC .......... *G06F 3/1291* (2013.01); *G06F 3/1203* (2013.01); *G06F 3/1225* (2013.01); *G06F 3/123* (2013.01); *G06F 3/1232* (2013.01); *G06F 3/1236* (2013.01); *G06F 3/1284* (2013.01)

(58) Field of Classification Search
CPC .... G06F 3/1291; G06F 3/1203; G06F 3/1225; G06F 3/1232; G06F 3/1236; G06F 3/123; G06F 3/1284
See application file for complete search history.

(56) References Cited

U.S. PATENT DOCUMENTS

| 6,026,436 | A | * | 2/2000 | Hawes | G06F 40/117 |
| | | | | | 709/229 |
| 7,688,464 | B2 | | 3/2010 | Lodolo | |
| 8,498,008 | B2 | * | 7/2013 | Kojima | G06F 3/123 |
| | | | | | 358/1.15 |
| 8,619,279 | B2 | | 12/2013 | Evanitsky | |
| 9,386,173 | B2 | | 7/2016 | Yamamoto | |
| 2007/0185979 | A1 | * | 8/2007 | Yoshida | G06F 3/1285 |
| | | | | | 709/220 |
| 2009/0282398 | A1 | * | 11/2009 | Shen | G06F 9/453 |
| | | | | | 717/174 |
| 2023/0305613 | A1 | * | 9/2023 | Saiki | G06F 1/3215 |

* cited by examiner

Primary Examiner — John R Wallace
(74) Attorney, Agent, or Firm — Millen, White, Zelano & Branigan P.C.; William F. Nixon

(57) ABSTRACT

A printing system implements a peer to peer network to manage resources between printing devices, such as configuration settings, software programs, or multifunctional printer (MFP) applications. When a printing device is added to the peer to peer network, it queries an existing printing device for information about its resources. Such information includes versions of the software programs. The information is used to compare the resources at the added printing device to those within the peer to peer network, using the existing printing device. Any differences are resolved by upgrading the resources at the added printing device by retrieving them within the peer to peer network.

10 Claims, 9 Drawing Sheets

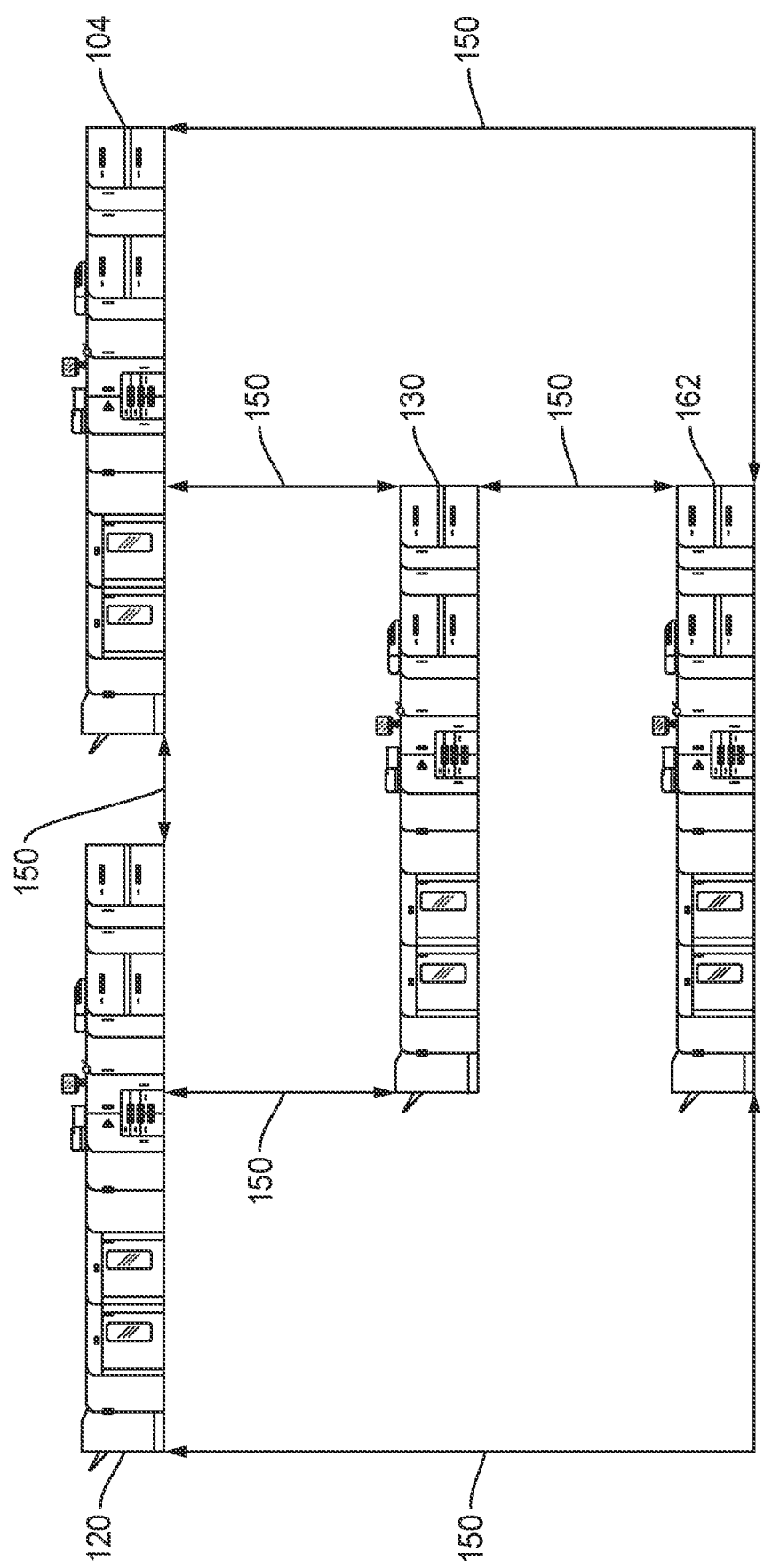

METHODS AND PRINTING SYSTEM FOR PEER-TO-PEER PRINTING DEVICE MANAGEMENT

FIELD OF THE INVENTION

The present invention relates to peer-to-peer printing device management between multiple printing devices having shared software applications.

DESCRIPTION OF THE RELATED ART

The management of printing devices in large organizations may be implemented by deploying either local or cloud solutions to perform functions such as software upgrades, application installations, device configurations, deployment of customizations, and the like. While this implementation works fine, cloud solutions may not be acceptable due to security considerations. In addition, local solutions may require deployment of a dedicated server, which is managed by the information technology staff of the organization. The dedicated server, therefore, results in additional resources and manpower. For smaller companies, a smaller number of printing devices may not require the complexity and costs of such printing device management solutions. Such costs may be prohibitive.

SUMMARY OF THE INVENTION

A method for managing a printing system is disclosed. The method includes accessing a printing system by a first printing device. The method also includes identifying a second printing device within the printing system by the first printing device. The method also includes querying the second printing device by the first printing device for information regarding at least one software program on the second printing device. The method also includes determining a difference between the at least one software program on the second printing device and at least one software program on the first printing device. The method also includes upgrading the at least one software program on the first printing device to match the at least one software program on the second printing device.

A method for managing printing devices within a printing system is disclosed. The method includes determining a first version of a software application on a first printing device needs to be upgraded when compared to a second version of the software application on a second printing device. The method also includes determining that the software application requires a software installer not available at the first printing device. The method also includes retrieving the software installer from component within the printing system. The method also includes downloading the second version of the software application to the first printing device. The method also includes installing the second version of the software application using the software installer at the first printing device.

A method for managing a plurality of printing devices within a printing system. The method includes establishing a plurality of connections from a first printing device to a set of printing devices within the printing system. The method also includes monitoring the set of printing devices using the plurality of connections to determine a difference in a software program at the first printing device and a software program at one of the set of printing devices. The method also includes retrieving a new version of the software program. The method also includes downloading the new version of the software program at the first printing device. The method also includes upgrading the software program with the new version on the first printing device.

BRIEF DESCRIPTION OF THE DRAWINGS

Various other features and attendant advantages of the present invention will be more fully appreciated when considered in conjunction with the accompanying drawings.

FIG. 1C illustrates a full mesh peer-to-peer network connecting a plurality of printing devices according to the disclosed embodiments.

DETAILED DESCRIPTION OF THE PREFERRED EMBODIMENTS

Figure 1A:
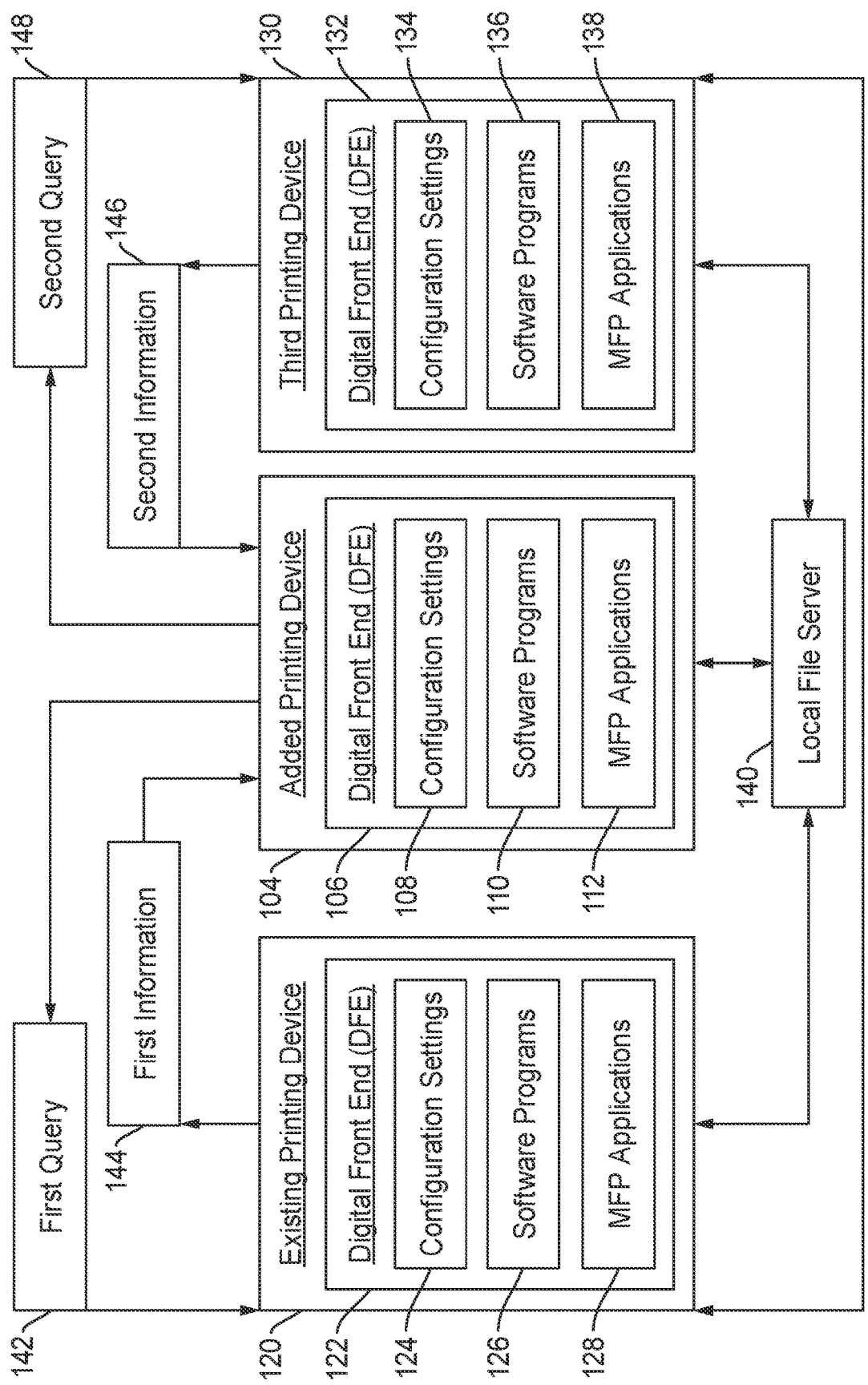
FIG. 1A illustrates a printing system for printing documents in a peer-to-peer network according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide printing device enhancements with most of the benefits of a centralized print management system without the complexity of installing, configuring, and managing a print management server. The disclosed embodiments also provide the features of the centralized print management system without the cost of either a print management server or a print management software-as-a-service (SaaS) solution.

The disclosed embodiments may operate in the following manner. When a printing device is added to a print network, the printing device will scan the network for other printing devices. This feature may be done as a user action during or after installation. Alternatively, this operation may be nominal behavior for the printing device. If the printing device finds an existing printing device in the network, then the added printing device will query for the information. This information may include versions of all installed software, system configuration, including the peer to peer printing devices with what the printing device is communicating, installed multifunctional printing (MFP) applications and their configurations, system customizations, and the like.

The added printing device will determine differences between its own configuration and the configuration of the existing printing device. If there are differences, then the printing device will do the following operations. If there are differences in the software versions, then the added printing device will upgrade its own software to match the software in the existing printing device. This operation may be done by accessing the vendor's software update mechanism or by retrieving the software upgrade from the existing printing device itself. The system may reboot as needed and repeat the above operations as many times as needed in order to match the software versions of the existing printing device. It should be noted that this process does not require the added printing device to upgrade to the latest software versions but, instead, to upgrade to the software versions that are already installed in the existing printing device.

Once the software version of the added printing device matches the version of the existing printing device, the added printing device will compare its configurations settings with those of the existing printing device. The added printing device will change its configurations to match those of the existing printing device. It also may reboot as needed. Configuration settings may include network configuration, authentication and authorization settings, usage policy configuration, print engine settings, panel settings and configuration, alert notification settings, and the like.

If there are differences in the MFP applications between printing devices, then the disclosed embodiments will download these from either a vendor's MFP application store or by retrieving the software from the existing printing device itself. After the applications are installed, the printing device will retrieve the application configuration from the existing printing device and apply it, along with rebooting as needed.

Thus, the operations disclosed above resemble the operations that are used by local or cloud print management systems. The source of information, however, will be the existing printing device and not an external system. In order to enable these operations, the printing device software will be enhanced to allow printing devices to query for all relevant system and application information. In addition, the printing device may enable download and installation of software using several processes. For example, the printing device may retain software installers for all system and application software that is installed in the printing device. The printing device also may perform system upgrades and application installation by retrieving installers from a local file server, a portable memory storage drive, or upload by the operator.

The printing device may share this information in the response to queries so the querying printing device may download the installers on its own. Alternatively, the existing printing device may act as a proxy to the added printing device in order to allow software updates without the need to configure authorization and access for the new printing device. The existing printing device provides the credentials for authorization. This feature prevents the spread of passwords or authorization credentials within the printing system. Although, presumably, the authorization and authentication would be configured when cloning other printing device configuration information, which should be done once the software versions of both printing devices are matched.

The printing device also may store the installer using the peer to peer network itself with the installer being split into blocks that are distributed to the printing devices in the network in a peer to peer distributed filesystem. Similar mechanisms may be used for both MFP application installation and configuration as well as customization installations and configurations.

Once the added printing device's configuration matches the existing printing device's configuration, the printing device will setup an ongoing connection to monitor for system changes. The printing device may select a subset of printing devices that it discovers either via querying the local network or by retrieving this information from the existing printing device. Monitoring may be done via subscription or via polling. If a change in any of the monitored information is discovered then the printing device will perform the above procedure to ensure it remains in sync with other printing devices within the printing system. Additionally, the printing device itself will be available for new or existing printing devices to perform the same sort of querying. Once the above processes are complete, any change in any printing device will be propagated to all printing devices in the printing system in a peer to peer manner. The change will propagate in a typical peer to peer fashion.

The decentralized peer to peer management may provide additional functionality. For example, the disclosed embodiments may provide failover printing, in which jobs are automatically redirected to another printing device when there is a persistent failure on a given printing device. The disclosed embodiments may provide tandem printing, in which large jobs are automatically divided between multiple printing devices. The disclosed embodiments also may provide print routing, in which jobs are forwarded to other printing devices based on capability matching or based on printing device speed. The disclosed embodiments also may provide pull or roaming printing, in which a job spool at any printing device may be retrieved from any other printing device. The disclosed embodiments also may provide print reporting, in which a single printing device retrieves all required information from other printing devices. The disclosed embodiments also may provide log retrieval, in which a single printing device retrieves print logs from other printing devices.

FIG. 1A depicts a printing system 100 for printing documents using added printing device 104, existing printing device 120, and third printing device 130 in a peer-to-peer network according to the disclosed embodiments. Printing system 100 may be located in a print shop or other environment suitable for production printing operations. Printing system 100 includes one or more printing devices 104, 120, and 130 that receive print jobs from one or more client devices.

The disclosed embodiments configure printing system 100 to share information and use that information to enable print management functions without the need for a separate print management server. Although printing system 100 is disclosed in terms of the Exchange Job Messaging Format (XJMF) protocol used in the production print industry, this functionality may be enabled using any protocol that supports print submission, such SMB printing, IPP, LPR, and the like. The functionality also may be enabled via any protocol that provides printing device information, such SNMP, REST API, and the like.

A peer-to-peer network may be used by system 100 to exchange data between the devices within system 100. The devices are configured to communicate over a physical communications interface or layer such as air interfaces and/or a direct wired connection. Air interfaces may be a given cellular communications protocol (e.g., GSM, CDMA, W-CDMA, EVDO, eHRPD, EDGE, 4G LTE, 5G LTE, 5G NR/New Radio, etc.) and, or a wireless IP protocol (e.g., IEEE 802.11 family). Alternatively, the peer-to-peer network of the printing devices may be a local area network, wide area network, or an ad-hoc network. Printing devices 104, 120, and 130 exchange data using the appropriate protocol.

Added printing device 104 is an example printing device and is disclosed in greater detail below. Existing printing device 120 and third printing device 130 may include the features disclosed for added printing device 104. Added printing device 104 includes an embedded digital front end (DFE) 106, or a printing device controller, that is the workflow touchpoint which accepts a print job, or print file, commonly a PDF or PostScript file. DFE 106 converts the file of a received print job into a format that print engine 260, disclosed below, can use to lay down the content of the document corresponding to the print job on a media. DFE 106 may include a raster image processor (RIP) as well as other components. DFE 106 also may schedule when a received print job is processed and other operations related to printing operations. DFE 106 is disclosed in greater detail below.

DFE 106 also includes settings, programs, and applications that may be used by added printing device 104 in performing operations within printing system 100. For example, DFE 106 includes configuration settings 108. Configuration settings 108 may include network configuration settings, authentication and authorization settings, usage policy configuration settings, print engine settings, panel settings, alert notification settings, color printing settings and the like. Configuration settings 108 may be those settings in added printing device 104 that dictate how the printing device is operate within printing system 100.

DFE 106 also may include software programs 110. Software programs will be disclosed in greater detail below. Software programs 110 may include operating system software for the printing device. In some embodiments, the software programs may have versions associated thereto. As updates are provided for the various programs, the versions may change accordingly. In addition to software programs 110, DFE 106 includes MFP applications 112. MFP applications 112 may be applications installed at added printing device 104 that may not necessarily be part of the software supported by DFE 106. Different vendors may provide the MFP applications, such as conversion applications, or scan to email applications. The vendors are responsible for their respective applications.

Printing system 100 includes at least one other printing device. Preferably, printing system 100 includes two printing devices forming a peer to peer network. Thus, existing printing device 120 and third printing device 130 may be within printing system 100. Additional printing devices also may be included. For example, printing system 100 may include 10 printing devices. As disclosed below, added printing device 104 may select a subset of the total number of printing devices with which to interact.

Existing printing device 120 includes DFE 122. DFE 122 may operate much like DFE 106, though it may have a different configuration and software. Thus, DFE 122 includes configuration settings 124. It also includes software programs 126 and MFP applications 128. Configuration settings 124, software programs 126, and MFP applications 128 may differ from configuration settings 108, software programs 110, and MFP applications 112 of added printing device 104. Third printing device 130 includes DFE 132. DFE 132 may operate like DFEs 106 and 122. DFE 132 includes configuration settings 134, software programs 136, and MFP applications 138 for third printing device 130.

Existing printing device 120 is a printing device already installed and operating within printing system 100. When added printing device 104 is added to printing system 100, it may scan the peer to peer network of printing devices in printing system 100 for existing printing device 120 and third printing device 130. Added printing device 104 may perform this operation by operator action during or after installation. Alternatively, the operation may be performed by added printing device 104 automatically upon connecting to the peer to peer network. In another alternative embodiment, added printing device 104 may be provided a list of printing devices within the peer to peer network along with applicable IP addresses.

Added printing device 104 identifies existing printing device 120 as a result of its scan. Identification may occur by selecting a printing device that most closely resembles the make and model of added printing device 104. Identification also may occur by selecting the printing device that includes the physical components of added printing device 104, such as output trays, components, color printing capability and the like. Identification also may occur by selecting the printing device nearest added printing device 104.

Added printing device 104 then sends first query 142 to existing printing device 120. First query 142 may come from DFE 106 and received by DFE 122 of existing printing device 120. First query 142 may request information from DFE 122 of existing printing device 120. In response, DFE 122 generates first information 144 that is provided back to DFE 106 of added printing device 104. This information may include the versions of all installed software of software programs 126, system configuration, including the peer to peer printing devices with which existing printing device 120 is communicating, in configuration settings 124, installed MFP applications and their configurations in MFP applications 128, system customizations, and the like.

DFE 106 of added printing device 104 then determines differences between its own configuration settings 108, software programs 110, and MFP applications 112 and configuration settings 124, software programs 126, and MFP applications 128 of existing printing device 120. If there are differences, then added printing device 104 will perform operations, as disclosed below, to bring its resources up to date and in line with the resources of existing printing device 120. These operations may include upgrading one or more of its software programs 110, retrieving a software installer to install new software programs, changing its configuration settings 108 to match configuration settings 124, and updating MFP applications 106.

In some instances, existing printing device 120 may not include all the configuration settings, software programs, or MFP applications on added printing device 104. Thus, added printing device 104 may query other printing devices to determine whether its resources are up to date or compatible within the peer to peer network. Added printing device 104 may send second query 148 to third printing device 130. Second query 148 may request the same information as disclosed above. In response, DFE 132 of third printing device 130 generates second information 146 and sends it to DFE 106 of added printing device 104. Added printing device 104 may perform the same analysis to determine differences between its configuration settings 108, software programs 110, and MFP applications 112 and configuration settings 134, software programs 136, and MFP applications 138 of third printing device 130. If differences exist, then added printing device 104 may perform the operations to bring its resources up to date and in compliance with the peer to peer network.

According to the disclosed embodiments, added printing device 104 would query a small number of printing devices in printing system 100. For example, a maximum of three printing devices may be queried in order to ensure continued synchronization if a printing device goes offline for some reason. A small number of printing devices for querying operations would keep the installation operations for added printing device 104 to a reasonable amount. Added printing device 104 would not need to query every printing device within the peer to peer network.

As disclosed above, first information 144 from existing printing device 120 may include a list of printing devices within the peer to peer network. Another list provided by existing printing device 120 may be a list of printing devices that the existing printing device with which the existing printing device is communicating. Once printing device 104 has the list of printing devices, it may identify or select a subset of printing devices using criteria noted above or it could just pick a small number of printing devices at random. Alternatively, added printing device 104 could see which printing devices are connected to which printing devices to select the printing devices that are connected to the least number of other printing devices. This operation should ensure the topology of connections is more distributed, to increase robustness of the peer to peer network. Added printing device 104 also could select printing devices on the same subnet, or, alternatively, on a different subnet to have a more enmeshed peer to peer network.

Printing system 100 also may include local file server 140. Local file server 140 may help printing devices perform system upgrades and application installation by providing software installers to the printing devices. For example, if added printing device 104 needs a specific software installer to install or upgrade a software program, then it may retrieve the latest installer from local file server 140. Local file server 140 may provide this capability as opposed to using portable storage drives or uploading the installer by an operator. Operations regarding local file server 140 may be disclosed in greater detail below.

Figure 1B:
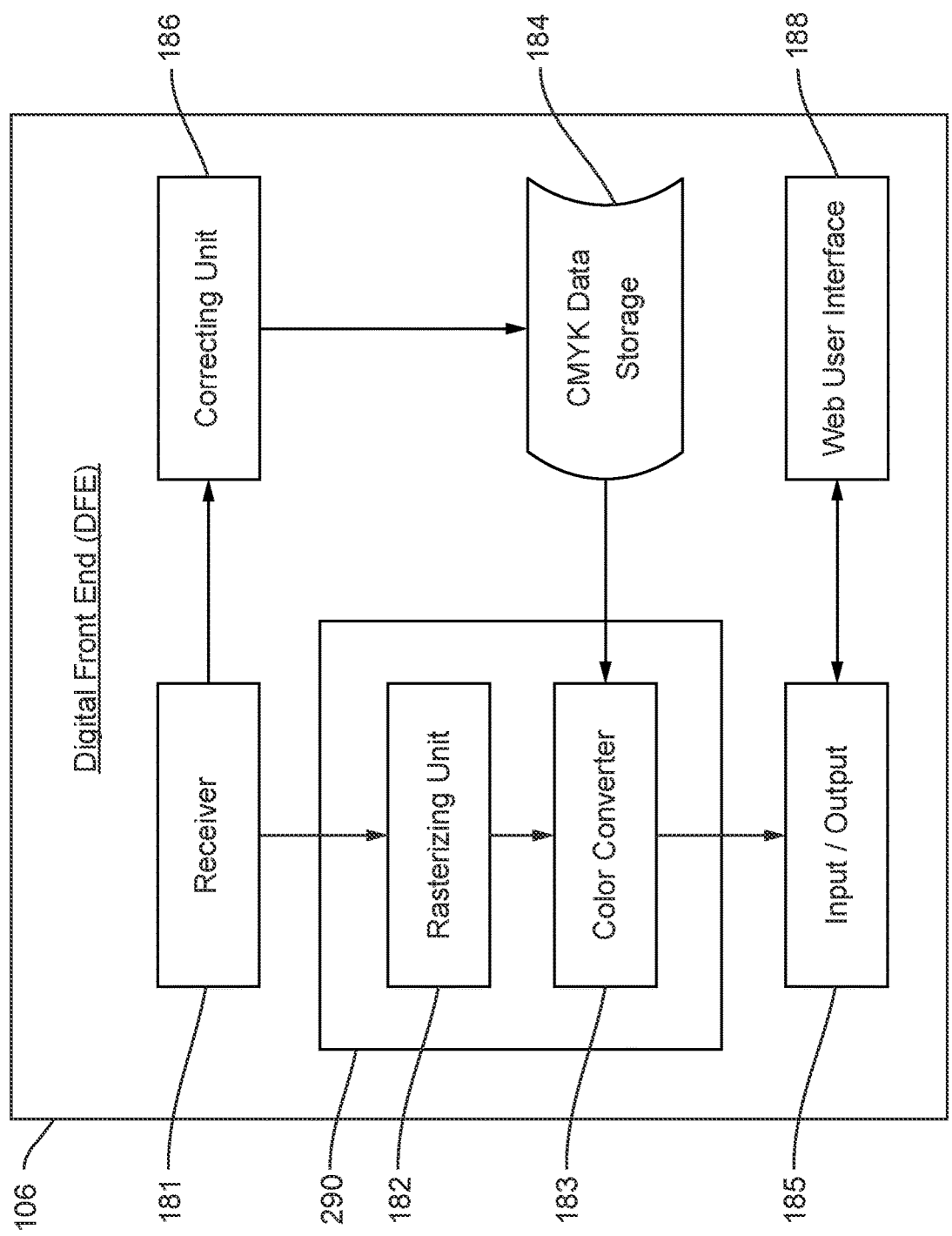
FIG. 1B illustrates a digital front end (DFE) for a printing device according to the disclosed embodiments.

FIG. 1B depicts a block diagram of DFE 106 according to the disclosed embodiments. The features disclosed by FIG. 1B also may apply to DFEs 122 and 132. DFE 106 includes a receiver 181, an RIP firmware 290 including rasterizing unit 182 and a color converter 183, an CMYK data storage 184, an input/output connector 185, and a correcting unit 186. RIP firmware 290 also is disclosed in FIG. 2. Additional components within DFE 106 may be implemented, including those disclosed in FIG. 1A. DFE 106, therefore, also stores configuration settings 108, software programs 110, and MFP applications 112, even though these are not shown in FIG. 1B.

Receiver 181 receives a print job 103 received within printing system 100 and outputs the print job to rasterizing unit 182 of RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

Rasterizing unit 182 converts image data associated with the print job into raster data to thereby generate rendering data, and outputs the generated rendering data to color converter 183. Color converter 183 converts the rendering data from rasterizing unit 182 into rendering data in a CMYK format. When the rendering data is originally in the CMYK format, or CMYK rendering data, the conversion may not be performed. Color converter 183 performs gradation conversion of the CMYK rendering data, with reference to one or more tone reproduction curves (TRCs). A TRC refers to data indicating the relationship between a colored gradation value for rendering data and print color, or print density, on a given print medium.

When print color provided by added printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

RIP firmware 290 includes rasterizing unit 182 and color converter 183. The rendering data generated by RIP firmware 290 is transmitted within added printing device 104 via input/output connector 185. The print condition information and the print medium type, as well as the rendering data, may be transmitted to engine 260 found in added printing device 104 disclosed in FIG. 2.

DFE 106 also includes web user interface 188 that may communicate with printing devices 120 and 130 using, for example, input/output connector 185. Web user interface 188, or web application, allows a user of the DFEs of other printing devices to interact with content or software running on DFE 106.

In some embodiments, the connections between the printing devices in the peer-to-peer network may be configured in a full mesh network. Alternatively, the printing devices in the peer-to-peer network may be configured in a partial mesh network. The different configurations may impact how the printing devices communicate to each other for updates, queries, sharing of printing device information, and the like.

FIG. 1C depicts a full mesh peer-to-peer network 160 connecting a plurality of printing devices according to the disclosed embodiments. Network 160 includes printing devices 104, 120, and 130, as disclosed above. It also includes printing device 162. Printing device 162 may be added to network 160 as disclosed above and below. The printing device information for printing device 162 is included in the printing device information available to network 160, such as provided to added printing device 104.

Connections 150 provide the links to allow each printing device within network 160 to communicate with all of the other printing devices. Each printing device sets up its own subscription to the other printing devices. For example, printing device 104 sets up its own subscriptions to printing devices 120, 130, and 162. It receives signals directly from a connected printing device whenever any relevant information changes at that printing device. For example, printing device 130 establishes subscriptions to printing devices 104, 120, and 162. Any change in relevant printing device information within any of those printing devices will be result in a signal to printing device 130. In other words, network 160 provides direct connections 150 between all of the printing devices within network 160.

The full mesh configuration of network 160 may be applicable for production printing environments with a limited number of printing devices. Further, the need for quick distribution of printing device information may be important to meet the demands of large print jobs. For resource matching, printing device 104, for example, may need information expeditiously in order to process and complete updates and synchronizations to match the capabilities of printing devices 120, 130, and 162.

Figure 1D:
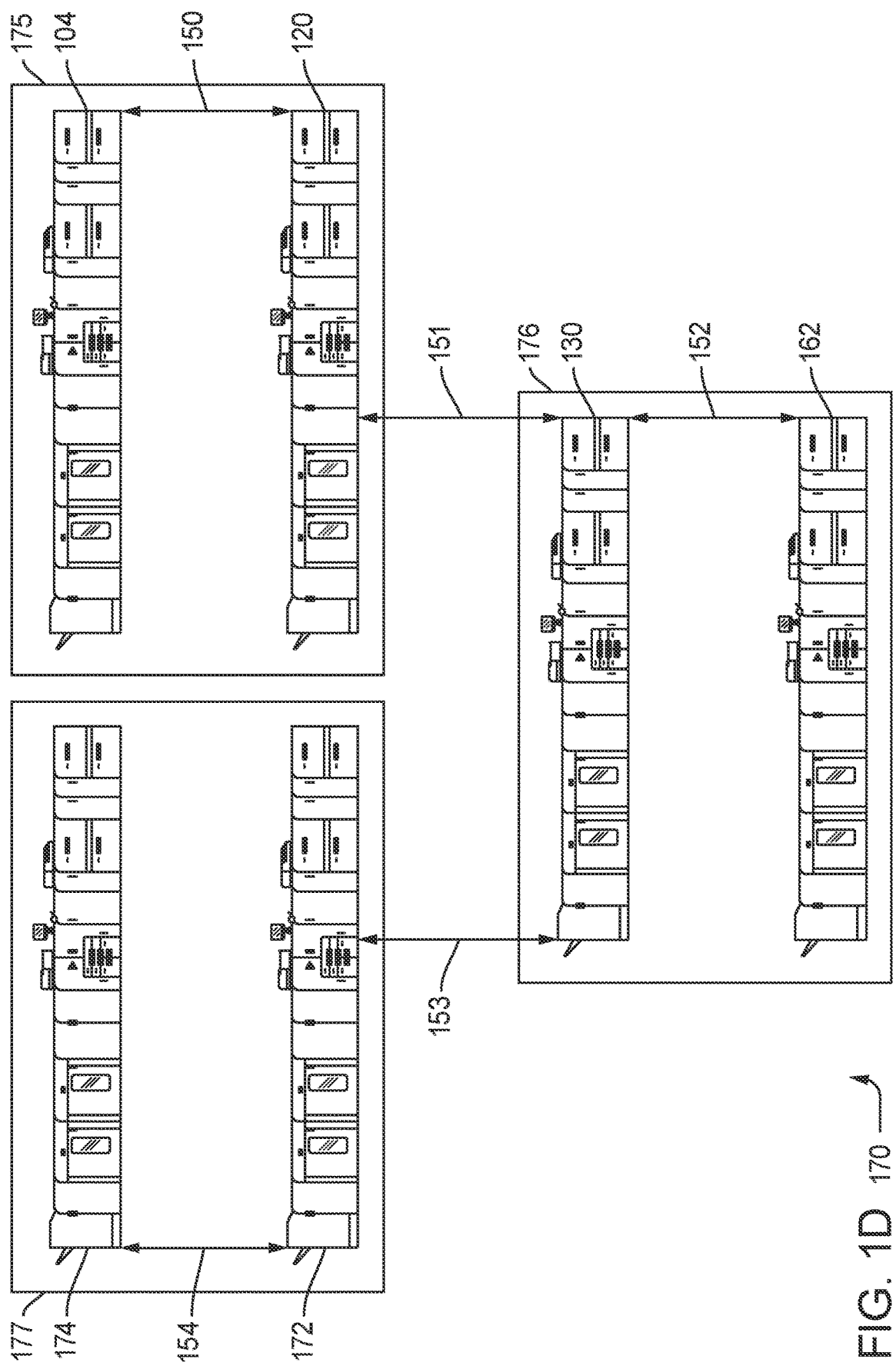
FIG. 1D illustrates a partial mesh peer-to-peer network connecting a plurality of printing devices according to the disclosed embodiments.

FIG. 1D depicts a partial mesh peer-to-peer network 170 connecting a plurality of printing devices according to the disclosed embodiments. In some embodiments, direction connections between a peer-to-peer network may not be feasible due to the large number of printing devices, such as an office environment. Further, complete connections between every printing device may not be feasible.

Thus, network 170 discloses a partial mesh peer-to-peer network between the DFEs of the printing devices. Network 170 may be established instead of implementing a print management server within printing system 100. Network 170 includes printing devices 104, 120, and 130 plus printing devices 172 and 174. Printing devices 172 and 174 may be added to network 170 as disclosed above and below. When added, network 170 may determine that printing devices 162 and 172 are connected to printing device 130 but not to printing devices 120 and 104. Printing device 174 is connected to printing device 172.

Added printing device 104 connects to printing device 120 using connection 150. Printing device 130 is added to network 170 but does not access connection 150. Instead, connection 150 is established between printing devices 120 and 104. Information is still shared with printing device 104 from printing device 130 but it goes through printing device 120. This feature also is implemented between printing device 130 and the newly added printing devices. Network 170 adds printing device 162, which exchanges printing device information with printing device 130 using connection 152. A change in printing device 104, therefore, will be provided to printing device 120 over connection 150 then to printing device 130 from printing device 120 over connection 151. Finally, the change in printing device information for printing device 104 will be provided to printing device 162 from printing device 130 over connection 152.

Network 170 then may add printing devices 172 and 174. A rule may be implemented in network 170 that a printing device may only have three direct connections with other printing devices. Thus, printing device 130 may not be directly connected to printing device 174. Network 170 configures printing device 174 to exchange printing device information with printing device 172 over connection 154, which then provides the information to printing device 130 over connection 153 and so on. The printing device information is updated accordingly using the connections as configured within network and not directly as disclosed in FIG. 1C.

The partial mesh configuration of network 170 reduces stress by not establishing direct connections between every printing device. Further, network 170 may implement rules used in performing load balancing and capability matching. For example, printing device 104 may need to refer a print job to another printing device and uses its connection to printing device 120 to send a signal requesting statuses from the other printing devices. Printing device 130 may obtain the information for printing devices 162, 172, and 174. It then may apply any rules, as disclosed below, to filter out those printing devices not capable of taking the print job.

In other embodiments, network 170 may include printing devices in different physical locations. Direct connections may not be possible or unwieldy to implement. For example, printing devices 104 and 120 are in a first location, or location 175, printing devices 130 and 162 are in a second location, or location 176, and printing device 172 and 174 are in a third location, or location 177. Connection 151 allows location 175 to communicate with location 176 while connection 153 allows location 176 to communicate with location 177. The connections within each location may establish a subnet at that location.

Printing device 120 may communicate with printing devices outside location 175 within network 170. Printing device 130 may do the same for location 176 and printing device 172 for location 177. Within network 170, location 177 may not be connected to location 175. Using the partial mesh configuration, network 170 exchanges printing device information between the locations without the need for an output management server.

In some embodiments, communication within network 160 may be done using a broadcast protocol. In other embodiments, a multicast protocol may be implemented within network 160 or network 170 to manage the delivery of the subscription signals within the network. For a broadcast configuration, the subscription signals go to all the connected printing devices within the network, such as shown in network 160. For a multicast configuration, the subscription signals go to a required set of devices within the network, such as shown in network 170. It should be noted that a multicast protocol also may be implemented in network 160.

Multicasting may be more efficient than broadcasting as it takes up less resources. For example, a network using multicasting may require less bandwidth when compared to broadcasting as not as much of it is needed for constant communication. Referring to network 170, printing device 104 only needs to exchange printing device information with printing device 120 over connection 150 and not with printing device 130, 162, 172, or 174.

For example, a broadcast protocol may transmit the subscription signal to multiple devices at the same time within the peer-to-peer network. Printing device 104 sends signals to printing devices 120, 130, and 162 of network 160 due to the subscriptions over connections 150. Although convenient, the broadcast protocol may cause security issues and generate data loss.

A multicast protocol may transmit the subscription signals to a group of printing devices in a network simultaneously. It may be more secure in that only some users receive the signals. It also divides a single transmission between printing devices to minimize bandwidth. User Datagram Protocol (UDP), for example, may be used. Using the example above, printing device 104 may only send signals to printing device 120 and 130 in network 160 and only to printing device 120 in network 170. The multicast protocol may be defined within the network to manage the subscriptions.

In other embodiments, referring to FIG. 1D, locations 175 and 176 may be in the same location and within the same subnet. Location 177 is in a different location. Communication occurs between the two locations via connection 153 between printing device 130 and printing device 172. Within network 170, a multicast protocol may be established between the printing devices at locations 175 and 176 and another multicast protocol between the printing devices at location 177. Using this example, a change to printing device information in printing device 162 may be sent to printing devices 104, 120, and 130 using the subnet multicast protocol. Printing device 130 then may send a signal to printing device 172.

Instead of a subscription-based process of communication, the disclosed embodiments may use polling between printing devices to determine when updates or changes are made to the configuration settings, software programs, or MFP applications of a printing device. For example, added printing device 104 may poll its connected printing devices on regular basis for information on its resources, much like it did using first query 142 and first information 144 with existing printing device 120. In this manner, upgrades and other operations to keep the resources at a printing device is not constant such that its programs and applications are not available for extended periods of time. Polling operations enable the printing device to schedule when upgrades and synchronizations occur to minimize down time or impact, such as on weekends or during late night hours.

Figure 2:
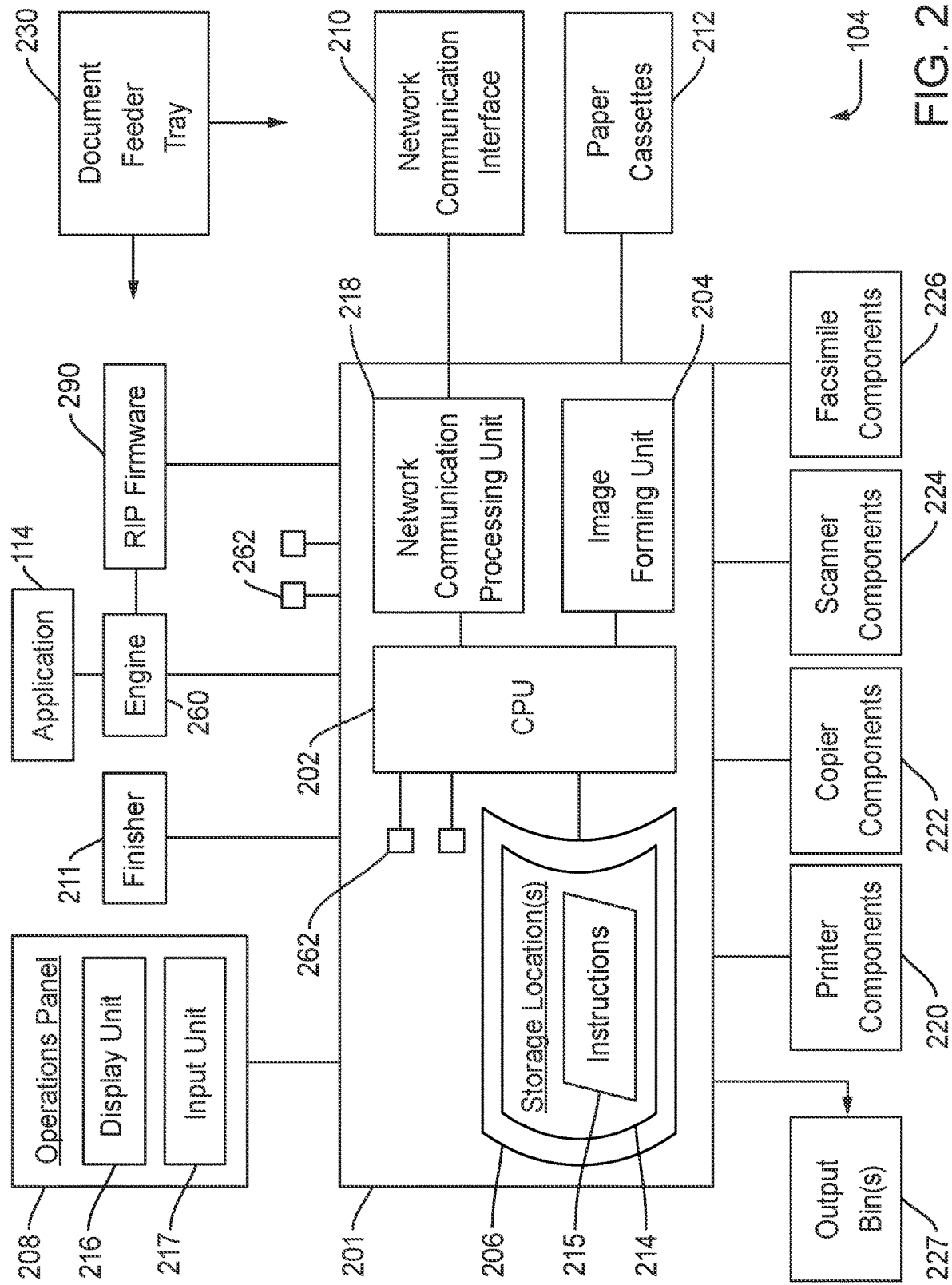
FIG. 2 illustrates a block diagram of components of the printing device for use within the printing system according to the disclosed embodiments.

FIG. 2 depicts a block diagram of components of added printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100, such as printing devices 120 and 130. As disclosed above, added printing device 104 may send and receive data from DFE 122 of printing device 120 and DFE 132 of printing device 130, and other devices within system 100.

Added printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within printing system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from printing devices 120 and 130 as well as other printing devices establishing a connection 150 to establish the peer-to-peer network.

Figure 3:
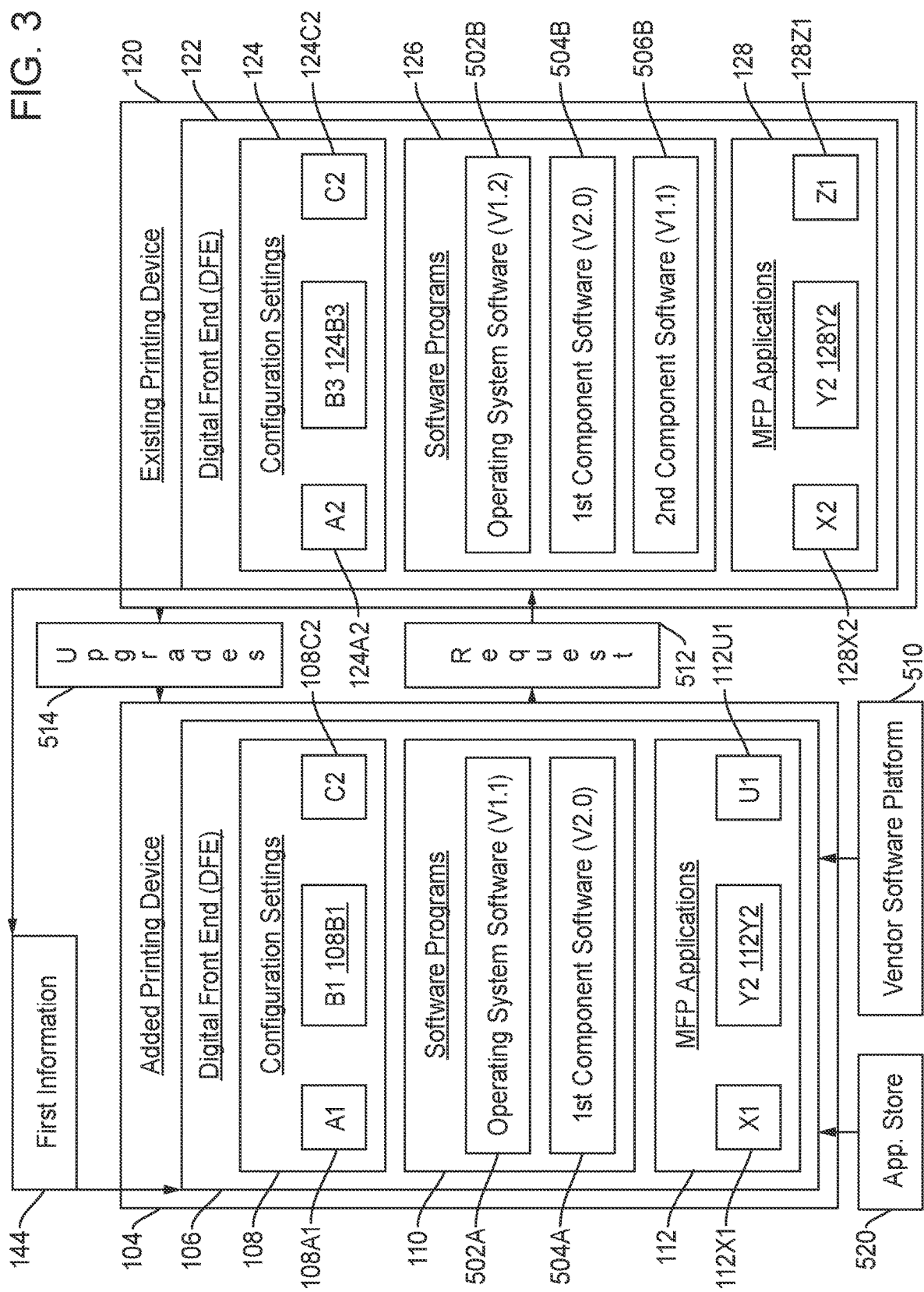
FIG. 3 illustrates a block diagram of updating and installation operations for an added printing device within a peer to peer network using an existing printing device according to the disclosed embodiments.

FIG. 3 depicts a block diagram of updating and installation operations for added printing device 104 within a peer to peer network using existing printing device 120 according to the disclosed embodiments. As disclosed above, added printing device 104 sends first query 142 to existing printing device 120 to obtain first information 144 about resources and programs being used by the existing printing device. This feature allows added printing device 104 to upgrade and synchronize its configuration settings, software programs, and MFP applications with the peer to peer network. This compatibility operation allows added printing device 104 to interact within the peer to peer network without having to download with a print management server.

FIG. 3 shows examples of how the resources may differ between printing devices. For example, configuration settings 108 of added printing device 104 may include configuration setting A1, configuration setting B1, and configuration setting C2. Configuration setting A1 may relate to a network configuration setting. Configuration setting B1 may relate to a print engine setting. Configuration setting C2 may relate an alert notification setting. As can be appreciated, configuration settings 108 may include many more configuration settings.

Existing printing device 120 includes configuration settings 124. Configuration settings 124 may include configuration setting A2, configuration setting B3, and configuration setting C2. Configuration setting A2 may relate to the network configuration setting. Configuration setting B3 may relate to the print engine setting. Configuration setting C2 may relate to the alert notification setting. First information 144 provides the information for configuration settings 124 to DFE 106 of added printing device 104.

The disclosed embodiments compare the information for configuration settings 124 of existing printing device 120 to configuration settings 108 of added printing device 104. Thus, the network configuration setting for added printing device 104 differs from the one at existing printing device 120, or configuration setting A1 differs from configuration setting A2. The print engine configuration setting also differs between the printing devices, or configuration setting B1 differs from configuration setting B3. In contrast, the alert notification setting for added printing device 104 matches the one for existing printing device 120, or configuration setting C2 matches configuration setting C2.

Added printing device 104 will change its configuration settings to match those of existing printing device 120. Thus, the network configuration setting for added printing device 104 is changed to configuration setting A2. The print engine setting for added printing device 104 is changed to configuration setting B3. The alert notification setting for printing device 104 is not changed.

The disclosed embodiments also compare software programs 110 of added printing device 104 to software programs 126 of existing printing device 120. As noted above, first information 144 should include the versions of all installed software programs. Referring to added printing device 104, software programs 110 include operating system software 502A which may be version 1.1 of this specific program. Software programs 110 also may include first component software 504A having version 2.0 of the program. Operating system software 502A may relate to the system software for added printing device 104 while first component software 504A may relate to software for a scanning or printing component at added printing device 104.

Existing printing device 120 also has its own software programs 126. Software programs 126 include operating system software 502B which may be version 1.2 of this specific program. Software programs 126 also may include first component software 504B having version 2.0 of this program. Software programs 126 also may include second component software 506B having version 1.1 of this program. Second component software 506B may relate to a different component than first component software 504B, such as a finisher or stapler on existing printing device 120.

First information 144 includes the information for software programs 126. DFE 106 receives this information and compares to the software programs and corresponding versions for the ones at added printing device 104. In this instance, the disclosed embodiments compare the software programs and corresponding versions in printing device 104 to those in printing device 120. For example, operating system software 502A includes version 1.1. Operating system software 502B of existing printing device 120 includes version 1.2. Thus, added printing device 104 needs to update operating system software 502A. Further, first component software 504A of added printing device 104 includes version 2.0. First component software 504B of existing printing device 120 also includes version 2.0. Thus, added printing device 104 does not need to update first component software 504A.

First information 144 also includes information that existing printing device 120 executes second component software 506B. Added printing device 104 does not have such a software program installed thereon. Thus, added printing device 104 will need to download second component software 506B. First information 144 may include information where to obtain second component software 506B. In some embodiments, added printing device 104 may download second component software 506B from the vendor's platform or another third party platform outside the peer to peer network.

As differences exist between software programs 110 of added printing device 104 and software programs of 126 of existing printing device 120, the disclosed embodiments upgrade the software programs of the added printing device to match those within the peer to peer network. This operation may be performed by accessing the vendor's software update mechanism. Thus, added printing device 104 may retrieve the versions of the software programs from vendor software platform 510. Vendor software platform 510 may represent all the vendor software platforms applicable to printing system 100, but are not shown here for brevity.

Alternatively, the disclosed embodiments may instruct added printing device 104 to obtain the versions of the software programs needed to join the peer to peer network from existing printing device 120. Added printing device 104 may send a request 512 to DFE 122 for the latest version of the applicable software programs. Existing printing device 120 then provides upgrades 514 back to added printing device 104. Upgrades 514, in this instance, may include operating system software 502B having version 1.2 to upgrade operating system software 502A. Upgrades 514 also may include second component software 506B, but, preferably, added printing device 104 downloads new software programs from vendor software platform 510, as disclosed below.

It should be noted that added printing device 104 is not updated software programs 110 with the latest versions of the programs. The latest versions may not be implemented in the peer to peer network. Instead, added printing device 104 is updating or upgrading to the software versions in existing printing device 120. The result of these operations allows added printing device 104 to interact with the peer to peer network in printing system 100 with the settings and software to do so in a consistent manner. Thus, added printing device 104 does not need to download settings or programs from a print management server. The peer to peer network allows new printing devices to be added without the need for such a server.

Added printing device 104 may reboot as needed and repeat the operations disclosed above in order to match the versions of the software programs in existing printing device 120. For example, added printing device 104 may need to reboot to run operating system software 502A having version 1.2 before doing any upgrades regarding other software programs. After the reboot, added printing device 104 may resend first query 142 to received updated first information 144. In this operation, it will be noted that added printing device 104 needs to download and install second component software 506B. After it does so, added printing device 104 may reboot again.

DFE 106 of added printing device 104 also includes MFP applications 112. As disclosed above, MFP applications 112 may differ from software programs 110 in that these items have separate vendors that manage distribution of the applications to printing devices. Added printing device 104 may not download these applications from existing printing device 120. For example, the vendor of the application may get paid for each application on a printing device.

MFP applications 112 include MFP application X1, MFP application Y2, and MFP application U1. First query 142 requests the information for MFP applications 128 of existing printing device 120. MFP applications 128 include MFP application X2, MFP application Y2, and MFP application Z1. Thus, differences exist between the MFP applications of the two printing devices. For example, MFP application X1 of added printing device 104 should be upgraded to MFP application X2. MFP application Y2 is fine as compared to MFP applications 128. Added printing device 104 also should download MFP application Z1. Existing printing device 120 may be notified to download MFP application U1.

The disclosed embodiments may download new versions of MFP applications from application store 520 for the vendor of the application. Added printing device 104 may download the updated MFP application X2 from existing printing device 120 but download MFP application Z1 from application store 520. After the MFP applications are installed, added printing device 104 may retrieve application configuration settings from existing printing device 120 and reboot as needed, much like with upgrades to software programs 110.

Figure 4:
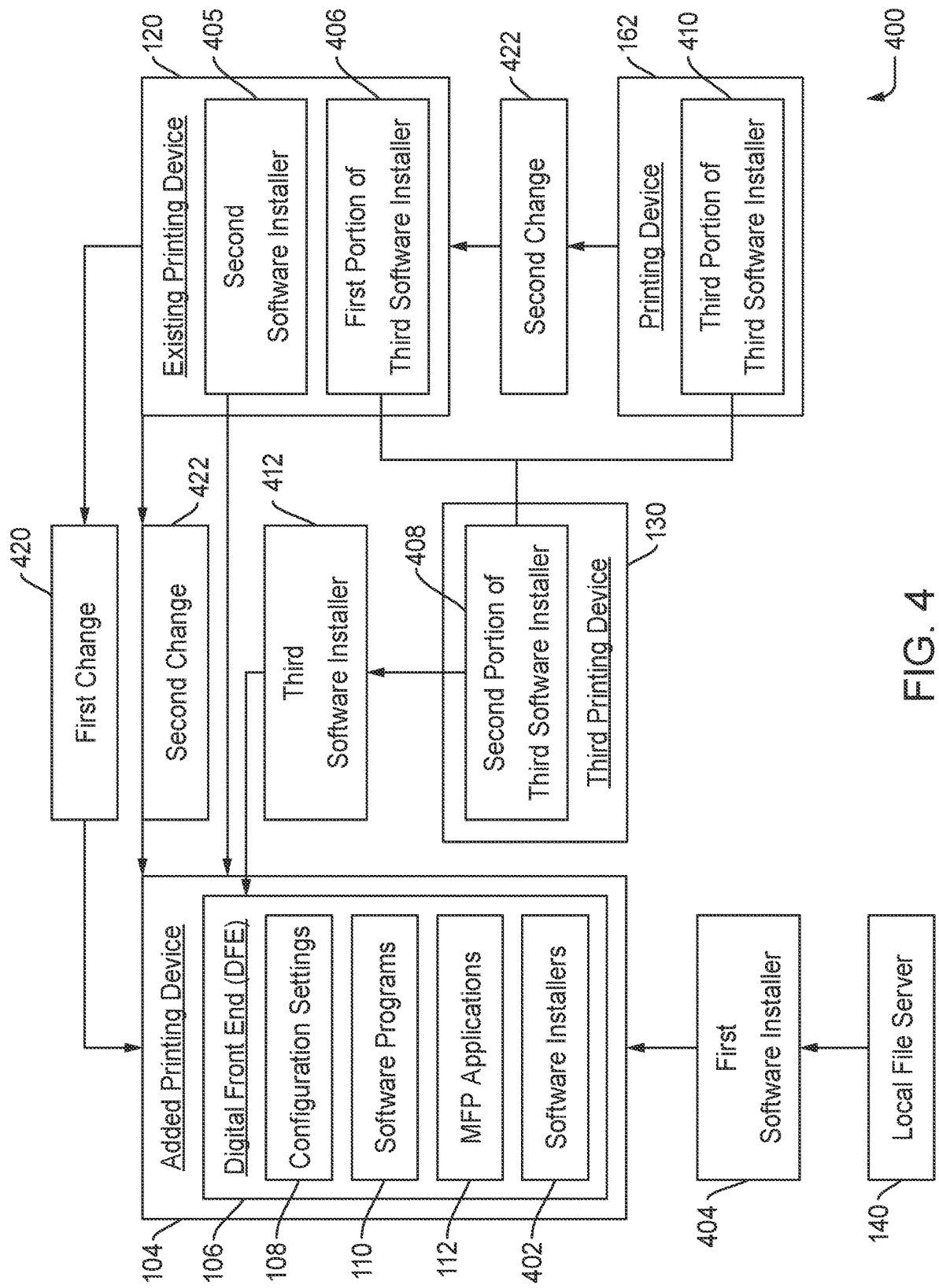
FIG. 4 illustrates a block diagram for implementing a software installer for upgrades within the peer to peer network according the disclosed embodiments.

FIG. 4 depicts a block diagram for implementing a software installer for upgrades within the peer to peer network according the disclosed embodiments. The disclosed embodiments may utilize the same processes implemented by local or cloud print management systems. The source of the information, however, will be in the devices themselves and not an external system. Added printing device 104 will download upgrades and new software programs or MFP applications. In doing so, added printing device 104 may need to use software installers. Software installers may be a command line utility that allows printing devices to install and uninstall resources be executing the installer components in specified assemblies.

Installation of a software program, include device drivers and plugin, may be referred to the act of making the program ready for execution. A particular configuration of a software program or MFP application is installed with the objective of making it usable within the printing device. A software installer may be itself a software program needed to install the upgraded or downloaded software program or MFP application. Because the process may vary for each program or application, these items may come with a software installer, which executes the operations needed to install the subject software program or MFP application.

In order to enable these features, software within DFE 106 for added printing device 104 includes the ability to query for all relevant system and application information. In addition, the disclosed embodiments enable added printing device 104 to download and install software programs or MFP applications by retaining software installers 402 for all system and application software that is installed at added printing device 104. The disclosed embodiments may share information with other printing devices in the peer to peer network regarding the different installers within software installers 402. Existing printing device 120 also may share information regarding its software installers.

Added printing device 104 also may perform upgrades and installation by retrieving software installers from local file server 140. Thus, added printing device 104 may retrieve first software installer 404 from local file server 140. Added printing device 104 may share this information regarding first software installer in response to subsequent queries within the peer to peer network so that other printing devices may download first software installer 404. Printing system 100 may want to manage revisions or upgrades so it may direct printing devices local file server 140 for software installers.

Alternatively, existing printing device 120 may act as a proxy to added printing device 104 in order to allow software updates without the need to configure authorization and access for the added printing device. This feature may reduce the spread of passwords or other data needed for authorization. Although, presumably, the authorization and authentication would be configured when cloning other printing device configuration information, which should be done once the versions of software programs between printing devices are matched.

In other embodiments, added printing device 104 may retrieve and store a software installer using the peer to peer network itself. Thus, added printing device 104 may retrieve second software installer 405 from existing printing device 120. Added printing device 104 may determine that second software installer 405 is available on existing printing device 120 from first information 144. This feature ensures that the version of second software installer 405 is consistent between printing devices.

In some embodiments, a software installer may be a large file, such as 50 MB. Such a download from one device may tie up a connection within the peer to peer network. This issue may reduce efficiency and capabilities within the network. Thus, the software installer may be split up between different printing devices within the peer-to-peer network. Different blocks, or portions, of the installer may be stored at different printing devices. This split feature allows added printing device 104 to download the portions as connections become available but without tying one up for a period of time.

For example, a third software installer 412 may be split into three different portions. First portion 406 of third software installer 412 may be stored at existing printing device 120. DFE 122 may store the portion. Second portion 408 of third software installer 412 may be stored at third printing device 130. Third portion 410 of third software installer 412 may be stored at printing device 162. Added printing device 104 is provided information on all portions in response to its queries to the respective printing devices. Using the connections within the peer to peer network, added printing device 104 downloads first portion 406, second portion 408, and third portion 410. The portions may be placed together within DFE 106 and stored with software installers 402.

Similar operations may be implemented for installation of MFP applications 112 and configuration settings 108. Files or data regarding these may be retrieved in the same fashion as disclosed above. Portions of the files may be stored within printing devices of the peer to peer network. These operations also may be implemented for customization installations and configurations.

Once the configuration, or resources, for added printing device 104 matches the configuration, or resources, for existing printing device 120, added printing device 104 will set up on ongoing connection 150 to monitor for system changes. Added printing device 104 may select a subset of printing devices that it discovers, either via querying the peer to peer network or by retrieving this information from existing printing device 120. As disclosed above, monitoring may be performed by subscription or by polling.

For example, added printing device 104 may select existing printing device 120 and third printing device 130 as its subset of printing devices. Printing device 162 is not selected. If a change in any of the monitored information is detected, then added printing device 104 will perform the processes and operations disclosed above to ensure it remains in sync with existing printing device 120 and third printing device 130, and, presumably, the peer to peer network. For example, during monitoring, added printing device 104 detects that first change 420 to one of the resources occurred. Information regarding first change 420 is communicated to added printing device 104 so that it may execute the appropriate operation to update its resources.

Existing printing device 120 may include its own subset of printing devices, which includes printing device 162 so that a second change 422 in printing device 162 will eventually make its way to added printing device 104 through updates via the peer to peer network. Second change 422 may be communicated from printing device 162 to existing printing device 120 when the existing printing device does its monitoring within its subset. As with first change 420, second change 422 is then provided to added printing device 104 during its monitoring as well.

Added printing device 104 may become available for new or existing printing devices to perform the same sort of querying. Added printing device 104 may be added to a new printing device's subset of devices. Thus, any change in any printing device will be propagated to all printing devices in a peer to peer manner. This feature replaces the need for a print management server and allows small print shops to upgrade resources and maintain consistency without additional costs.

Figure 5:
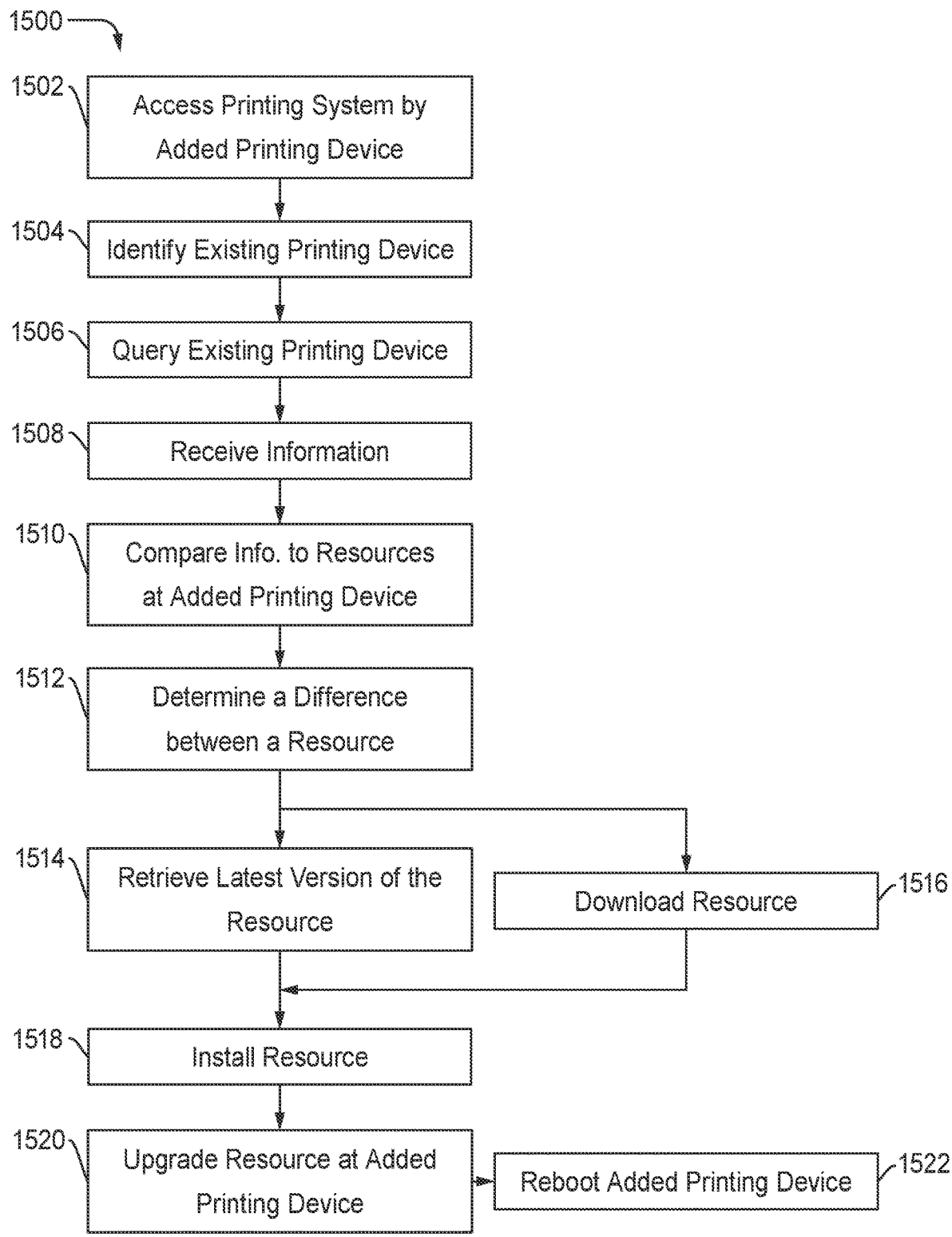
FIG. 5 illustrates a flowchart for synchronizing an added printing device using a peer to peer network according to the disclosed embodiments.

FIG. 5 depicts a flowchart 1500 for synchronizing added printing device 104 using a peer to peer network according to the disclosed embodiments. Flowchart 1500 may refer to FIGS. 1A-4 for illustrative purposes. Flowchart 1500, however, is not limited to the embodiments disclosed in FIGS. 1A-4.

Step 1502 executes by accessing printing system 100 by added printing device 104. Added printing device 104 is a new printing device being brought online with printing system 100. Printing system 100 may use one or more peer to peer networks to communicate and manage printing operations. Step 1504 executes by identifying existing printing device 120 within printing system 100 by added printing device 104. As disclosed above, existing printing device 120 may be selected from a plurality of printing devices according to some criteria, or may be selected at random.

Step 1506 executes by querying existing printing device 120 by added printing device 104 for first information 144 regarding resources at the existing printing device. Specifically, added printing device 104 sends first query 142 to existing printing device 120 regarding information about its software programs and MFP applications as well as its configuration settings. These components of existing printing device 120 may be referred to as resources. Added printing device 104 also includes its own resources of configuration settings 108, software programs 110, and MFP applications 112. These are disclosed above.

Step 1508 executes by receiving first information 144 from existing printing device 120 at added printing device 104. First information 144 includes information about the resources at existing printing device 120, or configuration settings 124, software programs 126, and MFP applications 128. The information also may include information about other printing devices within the peer to peer network.

Step 1510 executes by comparing the information about the resources of existing printing device 120 to the resources of added printing device 104. For example, the configurations settings may be compared to determine if there are differences between the configurations of added printing device 104 and existing printing device 120. Software programs 110 and their respective versions may be compared to software programs 126 and their respective versions. MFP applications 112 may be compared to MFP applications 128 to determine if the applications are the same.

Step 1512 executes by determining a difference between one of the resources in added printing device 104 and one of the resources in existing printing device 120. As disclosed above, there may be a difference in the configuration settings, the versions of the software programs, the number of software programs, the versions of the MFP applications, and the like. A difference may be defined as a change that needs to be made for added printing device 104 to come into alignment with existing printing device 120.

Step 1514 executes by retrieving a latest version of the resource to added printing device 104. Preferably, added printing device 104 retrieves the latest version from existing printing device 120, as disclosed above. Upgrades 514 may be provided from existing printing device 120. This feature allows for upgrades within the peer to peer network without the need to query a print management server or going outside the network. Alternatively, added printing device 104 may retrieve the latest version of a resource from vendor software platform 510 or application store 520.

Step 1516 executes by downloading a resource to added printing device 104. Step 1516 may execute in conjunction with step 1514 if needed, or may be executed instead of step 1514. For example, the result of steps 1510 and 1512 may be that the latest version of a resource is not needed, but a resource may be needed that is not present on added printing device 104. Thus, step 1516 downloads the resource within the peer to peer network, such as from existing printing device 120. Alternatively, the resource may be downloaded from a third party platform, such as vendor software platform 510 or application store 520.

Step 1518 executes by installing the latest version of the resource or the resource itself at added printing device 104. A software installer may be retrieved to install the resource. Step 1520 executes by upgrading the resource at added printing device 104 to match the resource at existing printing device 120. The resources at added printing device 104 should be synchronized with the resources at existing printing device. Step 1522 executes by rebooting added printing device 104, if needed, to implement the upgraded or installed resource. Further, this step may direct flowchart 1500 back to step 1506 to continue identifying and upgrading resources as needed.

Figure 6:
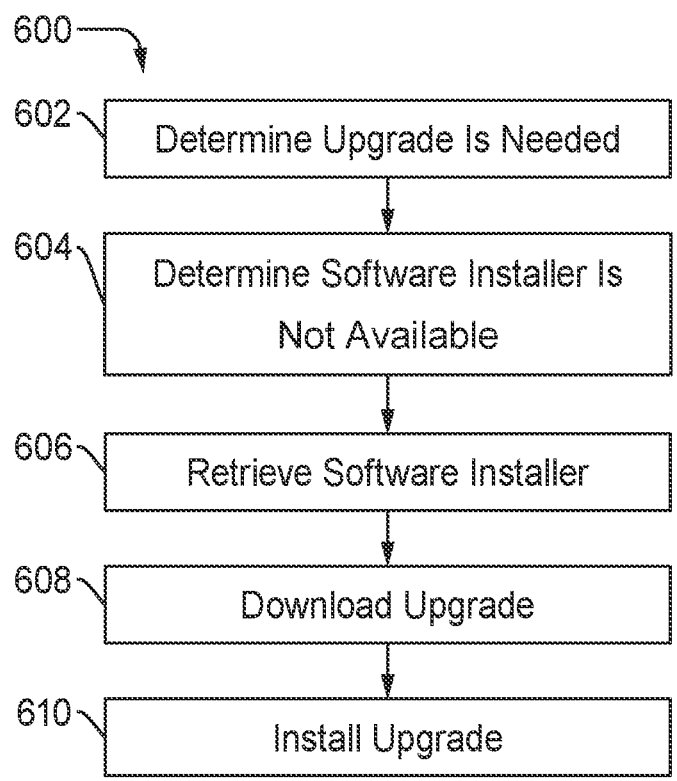
FIG. 6 illustrates a flowchart for implementing a software installer for a peer to peer network or printing devices according to the disclosed embodiments.

FIG. 6 depicts a flowchart 600 for implementing a software installer for a peer to peer network or printing devices according to the disclosed embodiments. Flowchart 600 may refer to FIGS. 1A-5 for illustrative purposes. Flowchart 600, however, is not limited to the embodiments disclosed by FIGS. 1A-6.

Step 602 executes by determining an upgrade is needed to a resource, such as configuration settings 108, software programs 110, or MFP applications 112, at added printing device 104. Further, instead of an upgrade, a resource may need to be downloaded to added printing device 104. The disclosed embodiments may refer to the downloading of a resource as "upgrading" the resource below.

Step 604 executes by determining that the upgrade requires a software installer not available at added printing device 104. Added printing device may include software installers 402. The software installer needed to install the upgrade is not available so that added printing device 104 need to obtain the software installer to complete the upgrade.

Step 606 executes by retrieving the software installer from a component within the printing system. Preferably, the software installer is retrieved within the peer to peer network. For example, second software installer 405 is retrieved from existing printing device 120 by added printing device 104. This feature alleviates the need to contact a component outside the peer to peer network. In some embodiments, added printing device 104 may be directed to retrieve the software installer from local file server 140.

In still other embodiments, the software installer may be a large file and split between multiple portions, or blocks, within the peer to peer network. These multiple blocks are stored between a plurality of components within the peer to peer network. Added printing device 104 retrieves the blocks from the components to implement the software installer. For example, added printing device 104 may retrieve first portion, or block, 406 of third software installer 412 from existing printing device 120, second portion 408 of third software installer 412 from third printing device 130, and third portion 410 of third software installer 412 from printing device 162. This feature prevents a connection between printing devices from being tied up downloading a large file.

Step 610 executes by installing the upgrade to the resource or a new resource on added printing device 104 using the downloaded software installer. Afterwards, the software installer is stored with software installers 402 at added printing device 104. This feature allows added printing device 104 to share the software installer in a peer to peer manner as well.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing a printing system, the method comprising:
   accessing the printing system by a first printing device;
   identifying a second printing device within the printing system by the first printing device;
   querying the second printing device by the first printing device for information regarding at least one software program on the second printing device;
   determining a difference between the at least one software program on the second printing device and at least one software program on the first printing device;
   upgrading the at least one software program on the first printing device to match the at least one software program on the second printing device;
   comparing at least one configuration setting at the first printing device with at least one configuration setting at the second printing device, wherein a configuration of the at least one configuration setting relates to a printing operation; and
   automatically matching the configuration setting related to the printing operation at the first printing device to the configuration setting related to the printing operation at the second printing device.

2. The method of claim 1, further comprising determining a difference between at least one application on the second printing device and at least one application on the first printing device.

3. The method of claim 2, further comprising downloading the at least one application on the second printing device to the first printing device.

4. The method of claim 1, wherein the first printing device includes a software installer to upgrade the at least one software program on the first printing device.

5. The method of claim 4, further comprising retrieving the software installer from a component within the printing system.

6. The method of claim 5, further comprising querying the second printing device for the software installer.

7. The method of claim 4, further comprising downloading the software installer from a plurality of components within the printing system.

8. The method of claim 1, further comprising establishing a connection between the first printing device and the second printing device to monitor for changes to the at least one software program.

9. A method for managing a plurality of printing devices within a printing system, the method comprising:
   establishing a plurality of connections from a first printing device to a set of printing devices within the printing system;
   monitoring the set of printing devices using the plurality of connections to determine a difference in a software program at the first printing device and a software program at one of the set of printing devices;
   retrieving a new version of the software program;
   downloading the new version of the software program at the first printing device;
   upgrading the software program with the new version on the first printing device;
   determining a change in a configuration setting related to a printing operation at one of the set of printing devices; and
   automatically modifying the configuration setting related to the printing operation at the first printing device to correspond to the change in the configuration setting related to the printing operation at the one of the set of printing devices.

10. The method of claim 9, wherein a number of printing devices within the set of devices is less than a number of the plurality of printing devices within the printing system.

* * * * *